United States Patent Office 3,497,535
Patented Feb. 24, 1970

3,497,535
STABILIZATION OF FATS AND OILS WITH ESTERS OF EDTA AND RELATED COMPOUNDS
William J. Lennon, Suffern, N.Y., assignor to Geigy Chemical Corporation, New York, N.Y., a corporation of New York
No Drawing. Filed July 25, 1967, Ser. No. 655,769
Int. Cl. C11b 5/00
U.S. Cl. 260—398.5
10 Claims

ABSTRACT OF THE DISCLOSURE

Fats and oils which are subject to oxidative deterioration are stabilized by means of an effective amount of an antioxidant and from about 0.05 to about 1000 weight parts per million of esters of EDTA as chelating agents.

Detailed disclosure

This invention relates to certain esters of ethylenediamine-tetraacetic acid (EDTA) and related compounds and to their use in stabilizing such autoxidazable materials as fats and oils of animal and vegetable origin and products containing them. More particularly, the present invention pertains to the utilization in a stabilizing system for the protection of fats and oils against the effects of oxidative deterioration, of esters of EDTA and related compound of the general structural formula

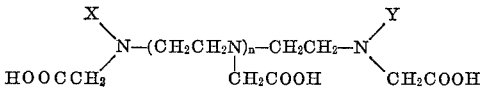

wherein $n$ is 0 or 1
X represents —CH$_2$COOR or —(CH$_2$)$_m$OCOR,
Y stands for —CH$_2$COOH, —CH$_2$COOR or —(CH$_2$)$_m$OCOR
wherein R represents straight- or branched-chain alkyl or alkenyl groups of up to 22 carbon atoms as for example, ethyl, propyl, butyl, pentyl, hexyl, heptyl, octyl, nonyl, decyl, dodecyl, tetradecyl, pentadecyl, heptadecyl, octadecyl, eicosyl, docosyl, etc. and the corresponding ethylenically unsaturated groups, and
$m$ is 1 or 2.

It is well known that some fats and oils, especially, prepared fat products such as lard and tallow are rather deficient in natural stabilizers and are therefore particularly susceptible to the development on storage of rancidity marked by off-flavors, odors and colors. It is further well known that a number of antioxidants, notably certain classes of substituted derivatives of benzene—such as butylated hydroxy toluene (BHT), butylated hydroxy anisole (BHA) or nordihydroguaiaretic acid, etc.—or gallic acid derivatives—such as propyl or lauryl gallate—alone or in combination with chelating agents such as citric acid or EDTA or salts thereof, such as, hydrohalides of EDTA or alkali metal salts, especially the sodium salts, of EDTA are capable of slowing the rate of deterioration in the presence of oxygen or air.

Thus, in commercial practice, antioxidants such as those mentioned above are commonly used in combination with chelating agents or metal deactivators. For example, citric acid or EDTA or a salt thereof, is commonly employed with BHT or BHA. However, the effectiveness of such a stabilizing system is limited due to solubility problems. For instance, EDTA or salts thereof have relatively low solubility in anhydrous fats and oils. Therefore, inconvenient dispersion techniques had to be employed to obtain any stabilizing effects. In many instances, such techniques would be impractical. For example, molten tallow shipped in tank cars is most conveniently stabilized by adding the stabilizer system to the empty car, followed by the introduction of the molten tallow. The inadequate mixing achieved by this procedure would preclude the use of a relatively insoluble material such as EDTA or salts thereof.

It is an object of this invention to provide a stabilizing system which is not subject to the disadvantages pointed out above which are characteristic of presently employed stabilizing systems for fats and oils. It is thus an object of this invention to effectively stabilize fats and oils with a stabilizer system containing relatively small amounts of a novel chelating agent which is readily soluble therein at use concentrations.

These and other objects which will become apparent hereinbelow are accomplished by utilization of esters of EDTA and related compounds of the above formula as chelating agents or metal deactivators in combination with the above-mentioned antioxidants.

Exceptional metal-deactivating activity as well as solubility in fats and oils is manifested by dialkyl esters of EDTA of the formula

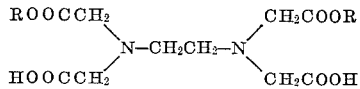

wherein R represents alkyl radicals, especially those having up to 22 C atoms, as for example, ethyl, propyl, hexyl, decyl, undecyl, dodecyl, tetradecyl, pentadecyl, octadecyl, eicosyl, etc. Particularly, the diethyl, didodecyl and dioctadecyl esters of EDTA are outstanding. For example, I have found surprisingly and unexpectedly that simple addition of 10 p.p.m. of didodecyl EDTA ester to lard containing 1 p.p.m. of copper and 50 p.p.m. of BHA prolonged the shelf life five times over lard containing 1 p.p.m. of copper, 50 p.p.m. of BHA and 25 p.p.m. of citric acid. Significantly, these new metal deactivators possess besides solubility in fats and oils also other requisite qualities for food-stabilizing agents, namely, relative non-toxicity, absence of bad odors, tastes or colors after incorporation in the fats and oils to be protected.

These newly-discovered chelating agents of the above formula, e.g. diesters of EDTA, can conveniently and economically be obtained as reaction products of EDTA dianhydride and suitable alcohols.

For instance, the didodecyl ester of EDTA was prepared in accordance with the following procedure: A mixture of 5.1 g. of EDTA dianhydride and 7.44 g. of dodecyl alcohol in 50 ml. of benzene was refluxed for 24¼ hours and was protected by a drying tube. The reaction mixture was filtered hot and washed with hot benzene. The benzene filtrate was cooled in an ice-bath, filtered and the white crystalline solid was washed with cold benzene followed by washing with hexane and dried in vacuo over P$_2$O$_5$. Obtained was 6.9 g. (yield: 55%) of the desired material; M.P. 98–99.5° C.

In an analogous manner, the diethyl and dioctadecyl esters of EDTA, M.P.'s 107–110° C. and 102.5–105° C., respectively, were prepared by using instead of dodecyl alcohol, ethanol and octadecanol.

EDTA dianhydride is prepared, for instance, as follows: 364 g. of ethylenediamine-N,N,N'N'-tetraacetic acid, 519 g. of acetic acid anhydride and 600 g. of pyridine are stirred at 65° C. for 24 hours. The reaction mixture which turns orange but gives no clear solution, is then filtered at 24° C. and the residue is washed first with acetic acid anhydride and then with diethyl ether. It is then dried at 60° C. and 12 torr. 307 g. of EDTA dianhydride {1,2-bis-[2,6-dioxo-morpholinyl(4)]-ethane} is obtained as white crystals; M.P. 195° C.

*Analysis* for $C_{10}H_{12}N_2O_6$ (MW 256.21): Calc'd: C, 46.87%; H, 4.73%; N, 10.93%; O, 37.47%. Found: C, 46.71%; H, 4.65%; N, 10.93%; O, 37.29%.

Special embodiments of this invention comprise stabilized fats, such as lard and tallow but other fats and oils which may likewise be stabilized in accordance with the present invention include particularly margarine but also butter and shortening as well as castor oil, linseed oil, rape seed oil, olive oil, corn oil, palm oil, coconut oil, peanut oil, safflower oil, soybean oil, and the like.

Stabilization of these materials is effected by adding thereto from about 0.05 to about 1000 weight parts per million, preferably from about 0.5 to about 200 weight parts per million of chelating agents of the above formulae in combination with effective amounts of antioxidants.

When tested by means of the Swift Stability Test or, as it is also called, the Active Oxygen Method, the subject compounds were found to retard the development of rancidity for about 20 to about 30 hours. The Swift Stability Test in general consists in bubbling air through a sample of the lard until rancidity is determined by observation of the induction period as noted by a rapid increase in peroxide values and is confirmed organoleptically.

This invention will be illustrated but is not limited by the following procedure.

EDTA diester samples were weighed on a Cahn Electrobalance and introduced directly into clean aeration tubes. Twenty grams of molten Marhoefer uninhibited lard containing the appropriate amounts of copper and antioxidant (BHA or BHT) was then added to each tube without employing any mixing or dispersion procedure.

The following stock solutions of BHT, BHA and copper were prepared in molten lard:

BHT=0.400 g. "Tenox" BHT/100 g.
BHA=0.500 g. "Tenox" BHA/100 g.
Cu++=0.1250 g. "Nuodex" Copper Naphthenate (8% Cu)/100 g.

After thorough mixing, the stock solutions were frozen and retained in the freezer until use.

Immediately prior to each run, the appropriate stock solutions were melted and were diluted with molten lard according to the following table:

10 g. BHT stock dilueted to 100 g.=400 p.p.m. BHT
1 g. BHA stock diluted to 100 g.=50 p.p.m. BHA
1 g. Cu++ stock diluted to 100 g.=1 p.p.m. Cu++

No stock solution was used after two remelts.

The samples were then fitted with air inlet tubes and placed in the aeration apparatus at 100° C. Lard samples were withdrawn periodically and checked for peroxide content by the following iodometric titration.

Using the air inlet tube as a pipette, seven drops of the molten lard (0.200 g.) was transferred to a clean 250 ml. Erlenmeyer flask. The lard was dissolved in 20 ml. of a 3:2 mixture of acetic acid and chloroform, followed by the addition of 1 ml. of saturated KI solution. This mixture was gently agitated and placed in the dark for approximately 1 minute. The sample was diluted with 100 ml. of distilled water, and titrated to a starch indicator (2 ml. of 0.5% starch) endpoint with 0.002 N $Na_2S_2O$. If the sample solution was deep yellow or brown when removed from the dark, it was titrated to a pale yellow before addition of the indicator. The sodium thiosulfate and starch solutions were prepared as follows:

*Sodium thiosulfate.*—A 0.1 N solution of $Na_2S_2O_3$ was prepared by dissolving 25 g. of $Na_2S_2O_3 \cdot 5H_2O$ in 250 ml. of water and diluting to one liter. After standing for 48 hours, the above stock solution was standardized by titration with 25 ml. aliquots of a 0.1001 N solution of potassium dichromate (4.9034 g. dried, reagent grade $K_2Cr_2O_7$ in 1 liter).

All 0.002 $Na_2S_2O_3$ used for titrations was prepared by a 1:49 dilution of the stock solution.

*Starch indicator (0.5%).*—One gram of starch was slurried with a small amount of water, followed by the addition of 200 ml. of boiling water. The resulting solution was boiled for 2 min., cooled and bottled. Fresh solutions had to be prepared at least every three days due to bacterial growth.

Since some lots of acetic acid contain large amounts of peroxide or develop peroxide upon standing, reagent blanks were run periodically. No corrections were required.

In the following tables reported induction periods are averages of duplicate samples.

The dependence of induction period on $Na_2$EDTA, citric acid and didodecyl EDTA ester concentrations in lard containing 50 p.p.m. BHA and 1 p.p.m. Cu is shown in Table 1.

TABLE 1

| Chelating agent | Concentration (p.p.m.) | Induction period (hrs.) |
|---|---|---|
| None | | 3.5 |
| $Na_2$EDTA | 10 | 3.5 |
| $Na_2$EDTA | 25 | 3.5 |
| $Na_2$EDTA | 50 | 3.5 |
| Citric acid | 10 | 4.0 |
| Do | 25 | 4.0 |
| Do | 50 | 5.5 |
| Didodecyl EDTA ester | 5 | 8.0 |
| Do | 10 | 20.5 |
| Do | 25 | 28.5 |
| Do | 50 | 29.75 |

From this table it is evident that under the test conditions used (no special mixing), even citric acid is almost completely ineffective at all concentrations, whereas the induction period approaches a maximum of approximately 30 hours as the concentration of didodecyl EDTA ester is increased.

The effectiveness of other EDTA diesters upon copper deactivation in lard containing 50 p.p.m. BHA and 1 p.p.m. Cu was also determined. The results are given in Table 2.

TABLE 2

| EDTA Ester | Concentration (p.p.m. as EDTA) | Induction period (hrs.) |
|---|---|---|
| | | 2.5 |
| Diethyl | 5 | 21.5 |
| Do | 10 | *29–45 |
| Didodecyl | 5 | 18.75 |
| Do | 10 | *29–45 |
| Dioctadecyl | 5 | 20.5 |
| Do | 10 | *29–45 |

*Failed overnight.

What is claimed is:

1. Fats or oils subject to oxidative deterioration containing an effective amount of an antioxidant which is butylated hydroxy toluene, butylated hydroxy anisole, nordihydroguaiaretic acid, propyl gallate or lauryl gallate, and from about 0.05 to about 1000 weight parts per million of dialkyl ester of ethylenediaminetetraacetic acid of the formula:

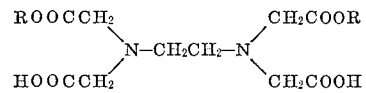

wherein R is an alkyl radical of 1 to 22 carbon atoms.

2. A composition of matter comprising fats or oils containing an effective amount of antioxidant selected from the group of butylated hydroxy toluene and butylated hydroxy anisole and from about 0.5 to about 200 weight parts per million of a dialkyl ester of ethylenediaminetetraacetic acid of the formula:

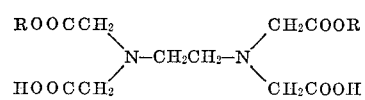

wherein R is an alkyl radical of 1 to 22 carbon atoms.

3. A composition of matter as claimed in claim 2 wherein the fat or oil is lard, and R is dodecyl.

4. A composition of matter as claimed in claim 3 wherein R is octadecyl.

5. A composition of matter as claimed in claim 2 wherein the fat or oil is tallow.

6. A composition of matter as claimed in claim 5 wherein R is dodecyl.

7. A composition of matter as claimed in claim 5 wherein R is octadecyl.

8. A composition of matter as claimed in claim 2 wherein the fat or oil is margarine.

9. A composition of matter as claimed in claim 8 wherein R is dodecyl.

10. A composition of matter as claimed in claim 9 wherein R is octadecyl.

References Cited
UNITED STATES PATENTS

| | | | |
|---|---|---|---|
| 2,714,113 | 7/1955 | Khurt | 260—398.5 |
| 2,732,386 | 1/1956 | Khurt | 260—398.5 |

DANIEL D. HORWITZ, Primary Examiner

U.S. Cl. X.R.

99—163; 252—401